Dec. 22, 1936.　　　　　J. A. DUTOUR　　　　　2,065,174
EARTH DIRT STOP FOR CULTIVATOR SHOVELS
Filed March 18, 1936　　　2 Sheets-Sheet 1
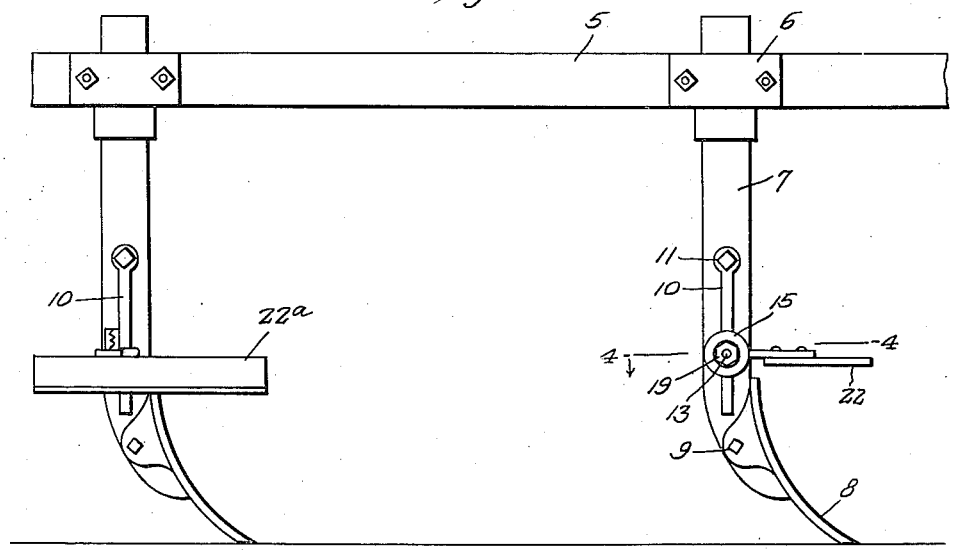
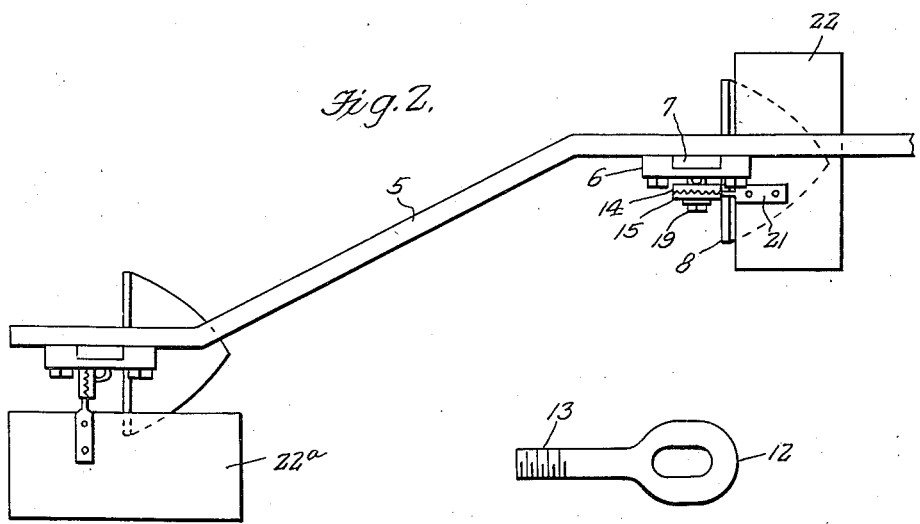
Inventor
John A. Dutour,
By Clarence A. O'Brien, and
Hyman Berman  Attorneys Dec. 22, 1936.     J. A. DUTOUR     2,065,174
EARTH DIRT STOP FOR CULTIVATOR SHOVELS
Filed March 18, 1936     2 Sheets-Sheet 2
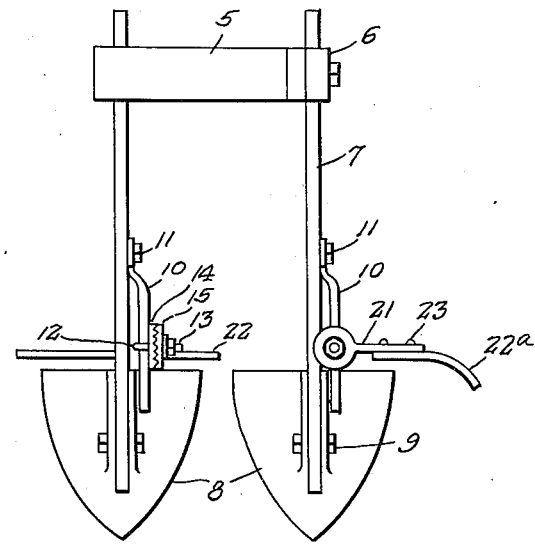
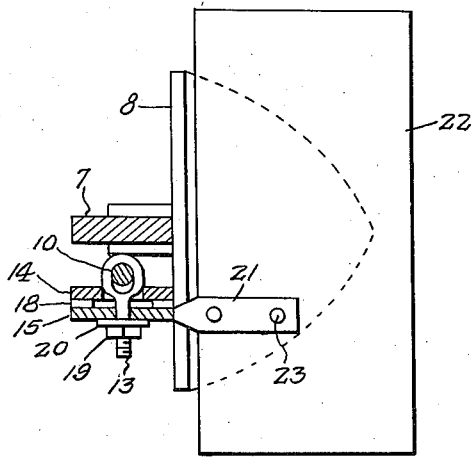
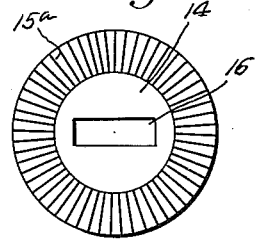
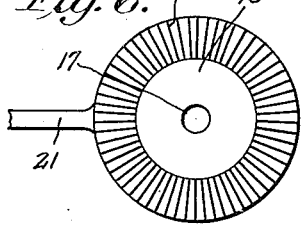
Inventor
John A. Dutour,
By Clarence A. O'Brien and
Hyman Berman   Attorneys Patented Dec. 22, 1936

2,065,174

UNITED STATES PATENT OFFICE 2,065,174

EARTH DIRT STOP FOR CULTIVATOR SHOVELS

John A. Dutour, Clifton, Ill.

Application March 18, 1936, Serial No. 69,551

1 Claim. (Cl. 97—188)

This invention appertains to new and useful improvements in the art of cultivators and more particularly to an improvement in cultivator shovels.

The principal object of the present invention is to provide a guard for cultivator shovels to the end that earth thrown upon the shovels will not ride high and over the shovels and fall over the young growths which frequently causes damage thereto.

Another important object of the invention is to provide a guard or shield of the character stated which can be adjusted to permit its use under varying conditions.

Other objects and advantages of the invention will become apparent to the reader of the following specification.

In the drawings:

Figure 1 is a fragmentary side elevational view of a cultivator gang showing the shield used in two different positions.

Figure 2 represents a fragmentary top plan view showing the shield used in two different positions.

Figure 3 represents a rear elevational view showing a pair of cultivator shovels with the shield thereon in different positions.

Figure 4 is a sectional view taken substantially on line 4—4 of Figure 1.

Figure 5 is an inside elevational view of one section of the adjustable joint.

Figure 6 is an inside elevational view of the other section of the adjustable joint.

Figure 7 is a side elevational view of the eye bolt.

Referring to the drawings wherein like numerals designate like parts, it can be seen that numeral 5 represents the cultivator gang beam having clamp means 6 thereon for supporting any number of shovel shanks 7 to the lower ends of which the cultivator shovels 8 are secured in the usual manner and denoted by numeral 9.

In carrying out the present invention, a short rod 10 provided with an inturned upper end portion is secured to the shank 7 as at 11 so that this rod will depend in substantially parallel relation to the shank 7.

As shown in Figure 6, an eye screw consisting of the eye portion 12 and the threaded shank 13 is employed with the rod 10 extending through the eye 12. A pair of disk members 14—15 are employed, the disk 14 being provided with an annular arrangement of radially disposed ribs 15 on one side thereof and with a rectangular shaped opening 16 in the central portion thereof for receiving the eye portion 12 of the eye bolt.

The other disk 15 is provided with a round opening 17 centrally located and through which the threaded shank 13 of the eye bolt extends. The rectangular shaped opening 16 in the disk 14 receives the portion 12 of the eye bolt so as to prevent rotation of the disk 14. The disk 15 is also provided with an annular arrangement of radial ribs 18 and these two ribbed faces are brought together as shown in Figure 4 and are clamped together by a nut 19 on the bolt 13 pressing the washer 20 against the disk 15. The disk 15 is provided with an arm flattened as at 21 and secured to the top side of the rectangular shaped shield 22 as at 23. This shield 23 may be transversely curved as denoted by reference character 22a in Figure 3 or perfectly flat. The shields 22, 22a can be disposed in front of the shank 7 or laterally thereof as suggested in Figure 1. As shown in Figures 1, 2 and 3, the flat shield 22 is placed on the advanced shovels above the front of the shovels, while the transversely curved shields 22a are placed on the rearmost shovel and disposed laterally thereof.

These shields serve to prevent rising of the earth in such a manner that it will fall onto the growing crops and damage the same.

While the foregoing specification sets forth the invention in specific terms, it is to be understood that numerous changes in the shape, size and materials may be resorted to without departing from the spirit or scope of the invention as claimed hereinafter.

Having thus described the invention, what is claimed as new is:

In a cultivator, a cultivator shovel provided with a shank, a guide rod secured at one end to the shank and extending in a position in parallel spaced relation to the shank, a shield plate, an adjustable clamp member on the rod and to which the plate is secured, said clamp consisting of a pair of disk members provided on their opposed faces with interlocking ribs, an eye bolt slidable by its eye on the rod, said disks being provided with openings therein for receiving the eye bolt, one of the said openings being square to accommodate a portion of the eye of the eye bolt, and a nut on the eye bolts for clamping the said disks together.

JOHN A. DUTOUR.